Aug. 9, 1927.
G. H. MULLINACK
1,638,269
EMERGENCY REPAIR FOR PIPES
Filed April 28, 1926
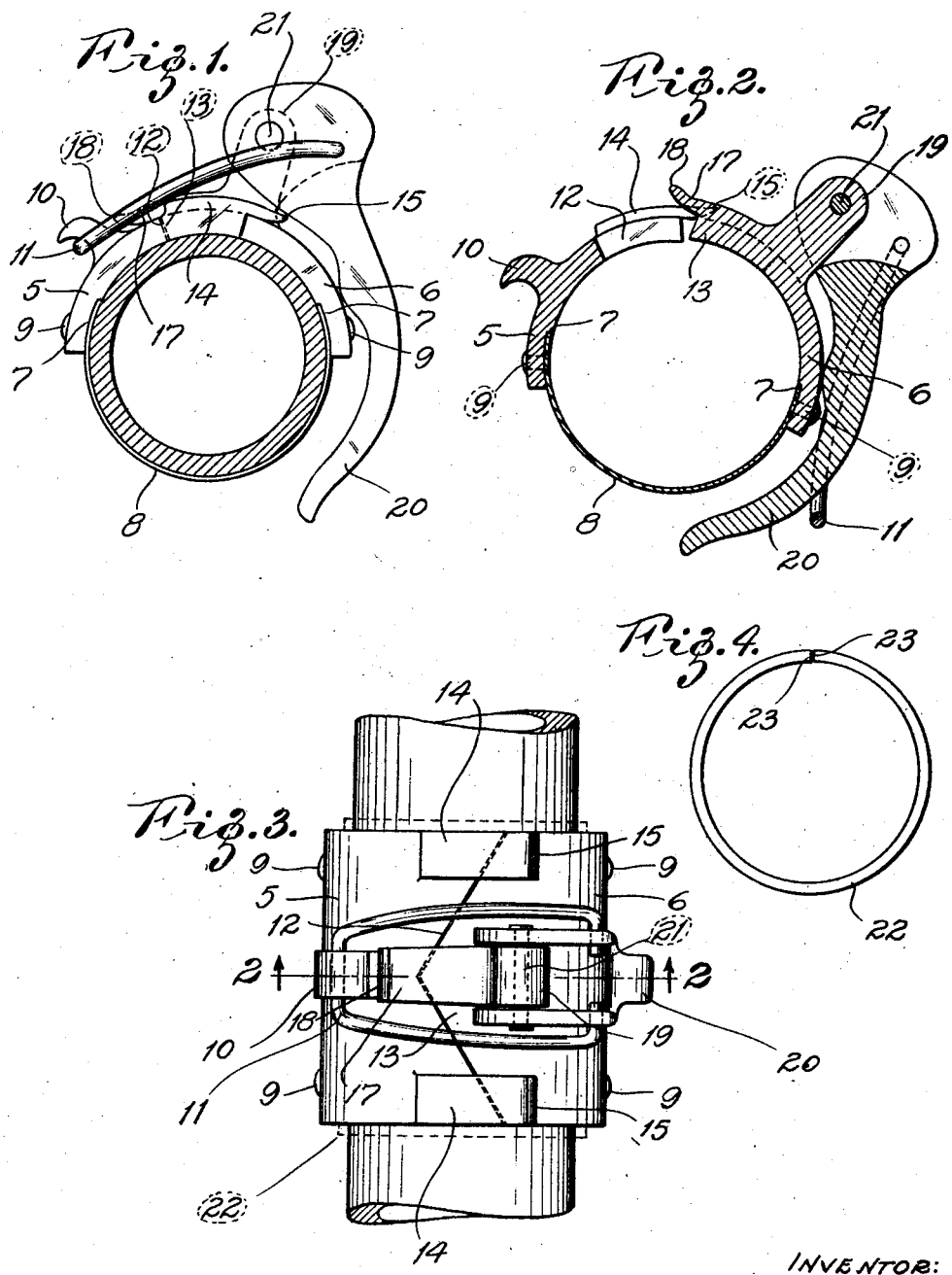
INVENTOR:
GEORGE H. MULLINACK
By Edward E. Longan
ATTORNEY.

Patented Aug. 9, 1927.

1,638,269

UNITED STATES PATENT OFFICE.

GEORGE H. MULLINACK, OF WEST FRANKFORT, ILLINOIS, ASSIGNOR OF TWENTY-THREE ONE-HUNDREDTHS TO ARTHUR E. SIMPSON AND TWENTY-THREE ONE-HUNDREDTHS TO JAMES ISAACS, OF WEST FRANKFORT, ILLINOIS.

EMERGENCY REPAIR FOR PIPES.

Application filed April 28, 1926. Serial No. 105,088.

My invention relates to improvements in emergency repair for pipes, and has for its primary object a device by means of which a sudden leak in a pipe of any kind can be quickly repaired.

A further object of my invention is to construct an emergency repair for pipes which can be used either on hose or similar flexible pipes or can be used on metal pipes so that the same can be repaired and their utility maintained without any appreciable loss of time.

My device is especially useful for railroads, fire departments and the like as the repair can be left on indefinitely. It can also be used for pipes of all kinds which are used in conveying fluids, such as water, oil and the like, air or steam.

My device is especially applicable to railroad work as it frequently happens that either the air hose or the air pipe underneath the car will develop a leak which will result in the setting of the air brakes. When this occurs, it is necessary to cut out or switch the car in which this leak has occurred so that the train may proceed. When this happens in switch yards, it frequently takes a very long time to cut out the car while, if it occurs on the main line, this is practically impossible because no switch and if the train is to continue all air brakes must be cut out of service, but with my device the leaky pipe can be quickly repaired and the train proceed on its way without any appreciable loss of time.

My device is also useful for repairing water pipes, steam pipes, and in fact any kind of pipe or tubular conveyor which may spring a leak.

In the drawings:

Fig. 1 is a side view of my device as applied to a pipe;

Fig. 2 is a cross section taken on the line 2—2 of Fig. 3 with the clamping means released;

Fig. 3 is a top plan view of the device; and

Fig. 4 is an end view of the gasket employed when using my device on metal pipes.

In the construction of my device I employ members 5 and 6 which are each provided with a recess 7, this recess being of sufficient depth to receive the flexible metallic strip 8. This strip is preferably formed of steel although other flexible material or metal may be used, it being essential however that the strip 8 be of some material which is substantially non-elastic so that it will not stretch. The strip 8 is secured in the recesses of the members 5 and 6 by means of rivets 9 which are countersunk in the strip 8 so that no projection will occur on the inside of the device. The member 5 is provided with a hook 10 over which the link 11 is adapted to pass. The purpose of this link will be explained in detail later.

The member 5 is also provided at one end with a V shaped indentation 12 which is adapted to receive the V shaped tongue 13 formed on one edge of the member 6. The member 5 is also provided with tongues 14 which have their ends 15 upturned so that they will readily slip over the member 6 when clamping the same, which tongues when in engagement prevent side movement of the members 5 and 6. The member 6 is provided with a tongue 17, the end 18 of which is also upturned so as to slide over the member 5. The tongues 14 and 17 prevent any independent outward or bulging movement of the meeting edges of the members 5 and 6 and also act as guides so that the meeting edges can be drawn closely together.

Formed on the member 6 is a lug 19 to which is pivotally attached a handle 20. Mounted in the handle 20 and adjacent the pivotal attachment is the link 11. The link 11 is so mounted in the handle 20 that when the handle is pulled in the position illustrated in Figs. 1 and 2, the handle will have a cam action and pull the link toward the lug 19 and when this link has been placed over the hook will draw the members 5 and 6 closely together thereby tightening the device around the pipe. The link 11 is pivoted in the handle 20 in such a manner that when the handle is pressed down as illustrated in Fig. 1, it will be slightly below the center of the pivot point 21 of the handle so that there will be no tendency of the handle or lever 20 to spring upwardly and disengage the link from the hook 10, in other words the handle is self-locking.

When applying my device to metallic pipe, the gasket 22 is employed. This gasket may be made of various substances as for instance, when repairing a pipe through which cold water or air passes, the gasket may be made of rubber. When repairing an oil pipe the gasket is made of some such material as will not be affected by oil, and when used for the passage of steam or other hot fluid or gas, the gasket may be made of asbestos or similar heat-resisting material. I desire it to be understood that my device may be made for any size or diameter of pipe and that the flexible member 8 may be made of any material which is flexible and still has very little elasticity or stretching quality.

In applying my device after the leak has been located, the link 11 is released from the hook 10 and the repair device opened out so that it can be slipped over the pipe. The members 5 and 6 are then brought together by hand and the link 11 placed over the hook 10. The handle 20 is then pressed down which securely binds the repair over the leaking portion.

Of course in rubber hose, or for fire department use, it is not necessary to use the gasket 22 but when the repair is used on metallic pipe of any kind, the gasket 22 is first placed in position. This gasket is of such size that when placed around the pipe to be repaired, its edges 23 will just meet so that an equal pressure can be exerted all around.

My device is especially useful in that a repair can be made in a very short time. There are no nuts or bolts to tighten down but merely the movement of a lever is necessary to clamp the device securely on the pipe to be repaired.

While I have shown my device with merely one hook and lever, I do not desire to limit myself thereto as there may be instances in which it is necessary to make a relatively long temporary repair and in this instance a plurality of levers, links and hooks will have to be employed to properly draw up the repair. This however will involve only the skill of an ordinary mechanic and therefore this structure has not been shown or described in detail.

Having fully described my invention, what I claim is:

1. A device of the class described comprising a pair of members having recessed edges, a flexible non-elastic strip secured in the recessed edges of said members for uniting the same, and means carried by one member and engaging with the opposing member for drawing said members together.

2. An emergency repair comprising a pair of members, a flexible non-elastic strip for uniting said members, means carried by one of said members and engaging with the other member for securing the same to a pipe, means projecting from one member and over the other member for preventing the outward movement of one member in respect to the other member, the meeting edges of said members arranged to interlock so as to prevent side movement of said members relative to each other.

3. A device of the class described comprising a pair of members having opposing edges, a flexible strip secured to said members adjacent the opposite edges, means carried by one member and engaging with the opposing member for drawing the same together and securing it around a pipe, and means carried by each member and overlapping the other member for preventing the outward movement of one member in respect to the opposite member.

In testimony whereof I have affixed my signature.

GEORGE H. MULLINACK.